(12) United States Patent
Keohane et al.

(10) Patent No.: US 7,890,603 B2
(45) Date of Patent: Feb. 15, 2011

(54) APPARATUS, SYSTEM AND METHOD OF PERFORMING MAIL MESSAGE SEARCHES ACROSS MULTIPLE MAIL SERVERS

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2598 days.

(21) Appl. No.: 10/406,660

(22) Filed: Apr. 3, 2003

(65) Prior Publication Data

US 2004/0199589 A1 Oct. 7, 2004

(51) Int. Cl.
G06F 15/16 (2006.01)

(52) U.S. Cl. .................. 709/219; 709/206; 709/207; 709/211; 707/706; 707/707

(58) Field of Classification Search .............. 709/206, 709/207, 211, 219; 707/706, 707
See application file for complete search history.

(56) References Cited

U.S. PATENT DOCUMENTS

| | | | |
|---|---|---|---|
| 5,905,863 A | 5/1999 | Knowles et al. | |
| 6,292,669 B1 | 9/2001 | Meuronen et al. | |
| 6,632,251 B1 | 10/2003 | Rutten et al. | |
| 6,807,539 B2* | 10/2004 | Miller et al. | 707/3 |
| 6,816,884 B1 | 11/2004 | Summers | |
| 6,823,368 B1 | 11/2004 | Ullmann et al. | |
| 6,963,904 B2 | 11/2005 | Yong | |
| 7,082,458 B1 | 7/2006 | Guadagno et al. | |
| 2001/0032245 A1* | 10/2001 | Fodor | 709/206 |
| 2001/0037332 A1* | 11/2001 | Miller et al. | 707/4 |
| 2001/0051990 A1 | 12/2001 | Shirakawa | |
| 2002/0059214 A1 | 5/2002 | Shibusawa et al. | |

(Continued)

FOREIGN PATENT DOCUMENTS

GB 2375850 A * 2/2001

(Continued)

OTHER PUBLICATIONS

Micfosoft Computer Dictionary 5th edition p. 325, 141.*

*Primary Examiner*—William C Vaughn, Jr.
*Assistant Examiner*—Mohamed Ibrahim
(74) *Attorney, Agent, or Firm*—Matthew W. Baca; Diana L. Roberts

(57) ABSTRACT

A system, apparatus and method of performing e-mail message searches across multiple mailboxes are provided. The system, apparatus and method perform the e-mail message searches across multiple mailboxes by launching a search feature of a currently accessed mailbox where at least one search term for a search is entered. Then, if multiple mailboxes are to be simultaneously searched, each mailbox is identified. The mailboxes are identified by their address, the username and password that are used to access them. Each mailbox is then accessed using the provided address, username and password. After accessing the mailbox, its search feature is launched and the search criteria passed to each launched search feature in order to perform the search. The mailboxes may be further identified by a particular name.

2 Claims, 9 Drawing Sheets

U.S. PATENT DOCUMENTS

| | | |
|---|---|---|
| 2002/0091772 A1 | 7/2002 | Yong |
| 2002/0091829 A1 | 7/2002 | Wood et al. |
| 2003/0104470 A1 | 6/2003 | Fors et al. |
| 2003/0177190 A1 | 9/2003 | Moody et al. |
| 2004/0059728 A1* | 3/2004 | Miller et al. .................... 707/3 |
| 2004/0064516 A1 | 4/2004 | Tsuboi et al. |
| 2004/0117358 A1* | 6/2004 | von Kaenel et al. ............ 707/3 |
| 2004/0133747 A1 | 7/2004 | Coldewey |
| 2006/0123037 A1 | 6/2006 | Takeshita et al. |

FOREIGN PATENT DOCUMENTS

| | | |
|---|---|---|
| GB | 2375850 A * | 11/2002 |

* cited by examiner

| MAIBOXES | ADRESSES | USER NAMES | PASSWORDS |
|---|---|---|---|
| YAHOO | http://mail.yahoo.com/?.intl=us | JOHN | DOE |
| MAILBOX 2 | ∘ ∘ ∘ | ∘ ∘ ∘ | ∘ ∘ ∘ |
| MAILBOX 3 | ∘ ∘ ∘ | ∘ ∘ ∘ | ∘ ∘ ∘ |
| ∘ ∘ ∘ | ∘ ∘ ∘ | ∘ ∘ ∘ | ∘ ∘ ∘ |

605 · 610 · 615 · 620

[MORE] 625  [FINISH] 630

FIG. 6

RELATED MESSAGES    [SEARCH]

CURRENT MAILBOX — 710

| FROM | SUBJECT | RECEIVED | FOLDER |
|---|---|---|---|
| JANE DOE | PATENT | 1/1/2003 | INBOX |
| ⋮ | ⋮ | ⋮ | ⋮ |

720

YAHOO

| FROM | SUBJECT | RECEIVED | FOLDER |
|---|---|---|---|
| JANE DOE | PATENT | 1/1/2003 | INBOX |
| ⋮ | ⋮ | ⋮ | ⋮ |

MAILBOX 2

| FROM | SUBJECT | RECEIVED | FOLDER |
|---|---|---|---|
| JANE DOE | PATENT | 1/1/2003 | INBOX |
| ⋮ | ⋮ | ⋮ | ⋮ |

MAILBOX 3

| FROM | SUBJECT | RECEIVED | FOLDER |
|---|---|---|---|
| JANE DOE | PATENT | 1/1/2003 | INBOX |
| ⋮ | ⋮ | ⋮ | ⋮ |

FIG. 7

20030304124629.D39944 @ AUSTIN.IBM.COM
            A                      B

FIG. 8

APPARATUS, SYSTEM AND METHOD OF PERFORMING MAIL MESSAGE SEARCHES ACROSS MULTIPLE MAIL SERVERS

CROSS-REFERENCE TO RELATED APPLICATIONS

This application is related to co-pending U.S. patent application Ser. No. 10/406,662, entitled APPARATUS, SYSTEM AND METHOD OF PERFORMING MAIL MESSAGE THREAD SEARCHES herein, filed on even date herewith and assigned to the common assignee of this application.

BACKGROUND OF THE INVENTION

1. Technical Field

The present invention is directed to e-mail application programs. More specifically, the present invention is directed to an apparatus, system and method of performing mail message searches across multiple mail servers.

2. Description of Related Art

All mail user client application programs or mail user agent (MUA) application programs have a search feature. The search feature allows users to perform searches, based on different attributes, for messages in their mailboxes. For example, a user may perform a search for messages from a particular sender, messages sent to a particular recipient, messages sent or received on a particular date, messages having a particular subject matter etc. or a combination thereof.

Nowadays, many users have more than one mailbox (i.e., more than one e-mail address). Consequently, one particular e-mail message may reside at more than one of a user's mailboxes. Presently, when a user desires to perform a search for messages that may be in different mailboxes, the user must perform the search as many times as there are mailboxes that belong to the user. This can be a rather cumbersome and time consuming endeavor.

Thus, what is needed is a system, apparatus and method of performing e-mail message searches across multiple mailboxes.

SUMMARY OF THE INVENTION

The present invention provides a system, apparatus and method of performing e-mail message searches across multiple mailboxes. The system, apparatus and method perform the e-mail message searches across multiple mailboxes by launching a search feature of a currently accessed mailbox where at least one search term for a search is entered. Then, if multiple mailboxes are to be simultaneously searched, each mailbox is identified. The mailboxes are identified by their address, the username and password that are used to access them. Each mailbox is then accessed using the provided address, username and password. After accessing the mailbox, its search feature is launched and the search criteria passed to each launched search feature in order to perform the search. The mailboxes may be further identified by a particular name.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a table listing a plurality of mailboxes that are to be searched.

FIG. 7 depicts a format for presenting the result of a search performed across a plurality of mailboxes FIG. 8 depicts a representative message identification number.

DETAILED DESCRIPTION OF THE PREFERRED EMBODIMENT

Figure 1:
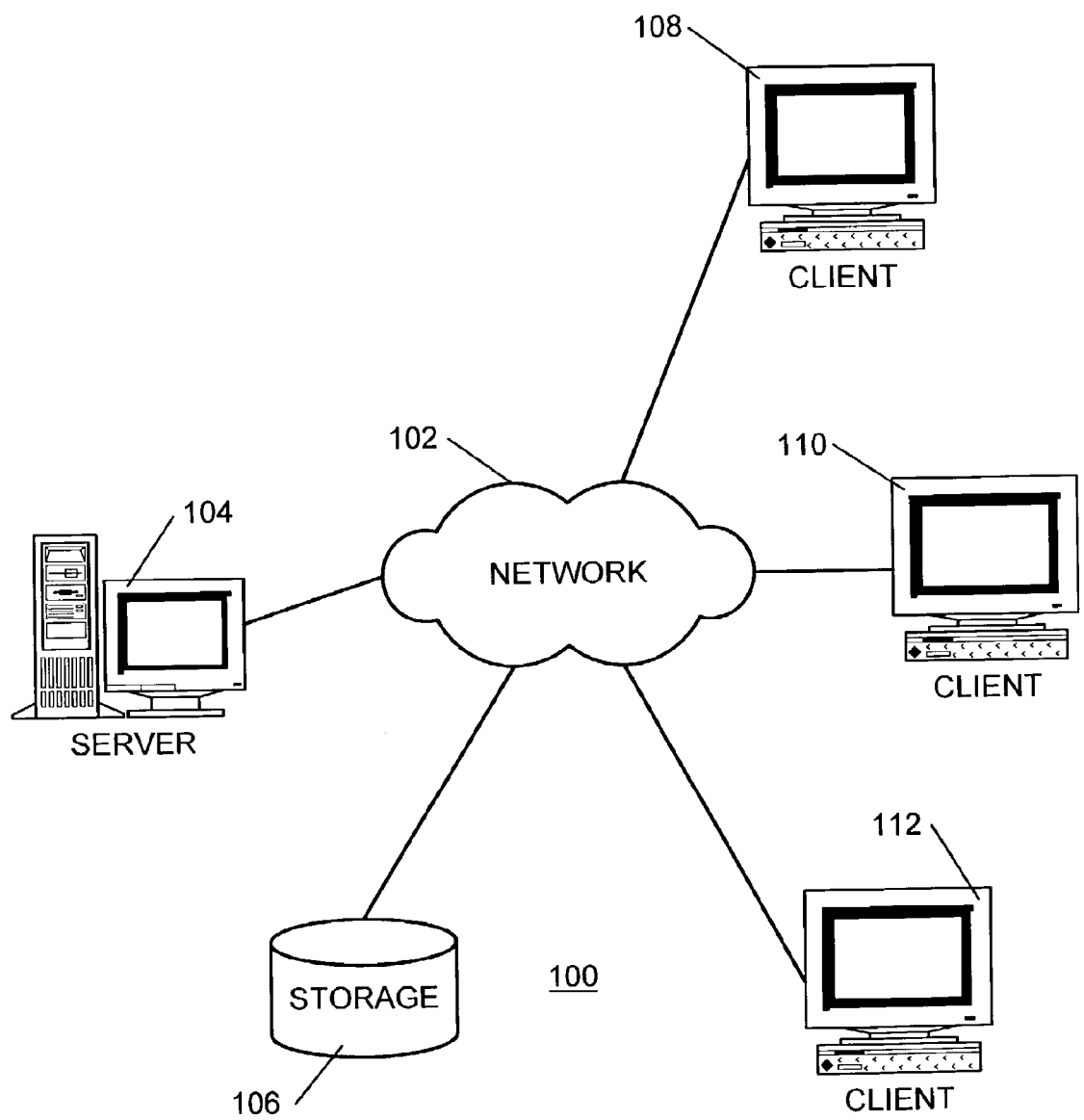
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
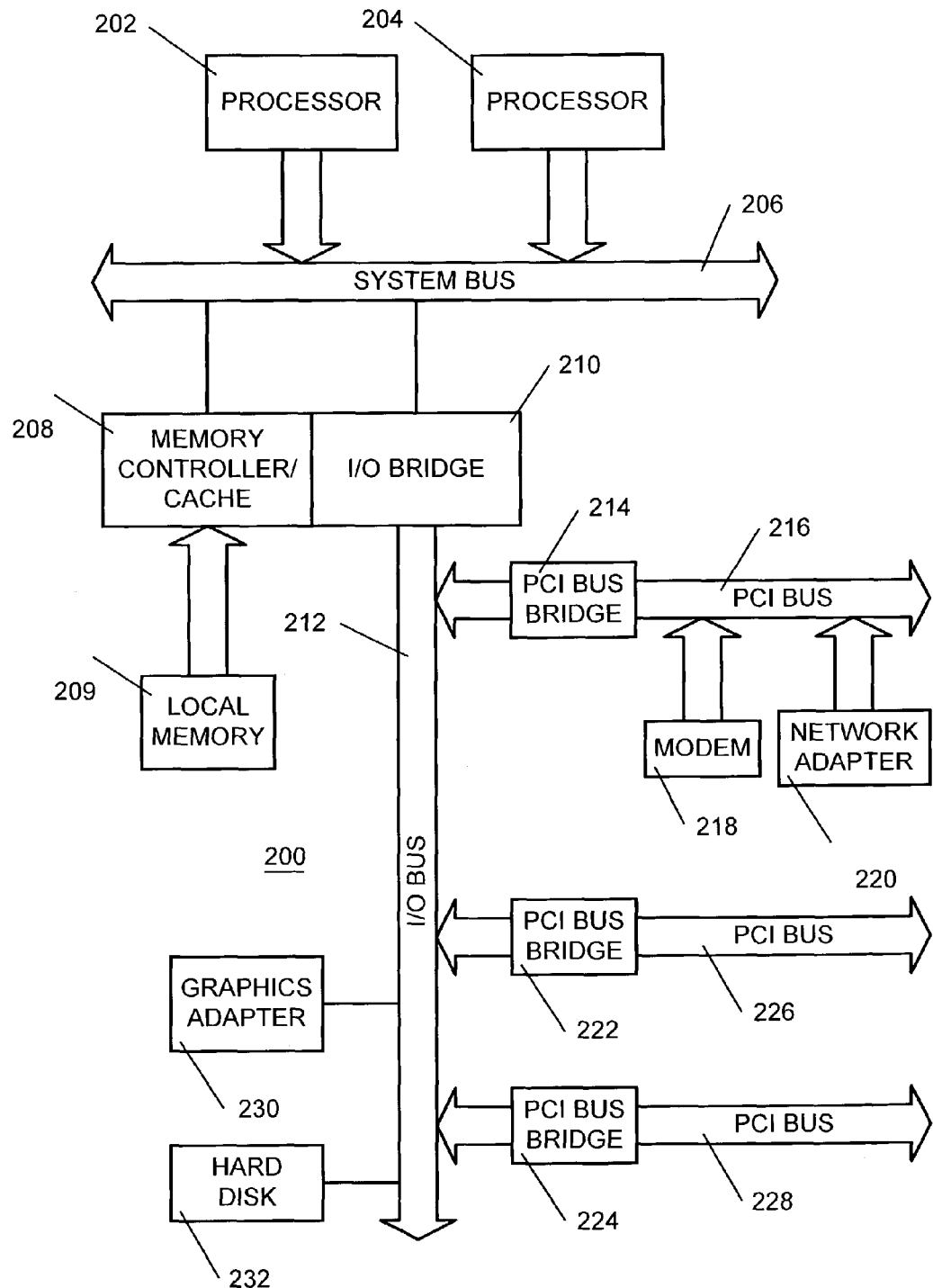
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
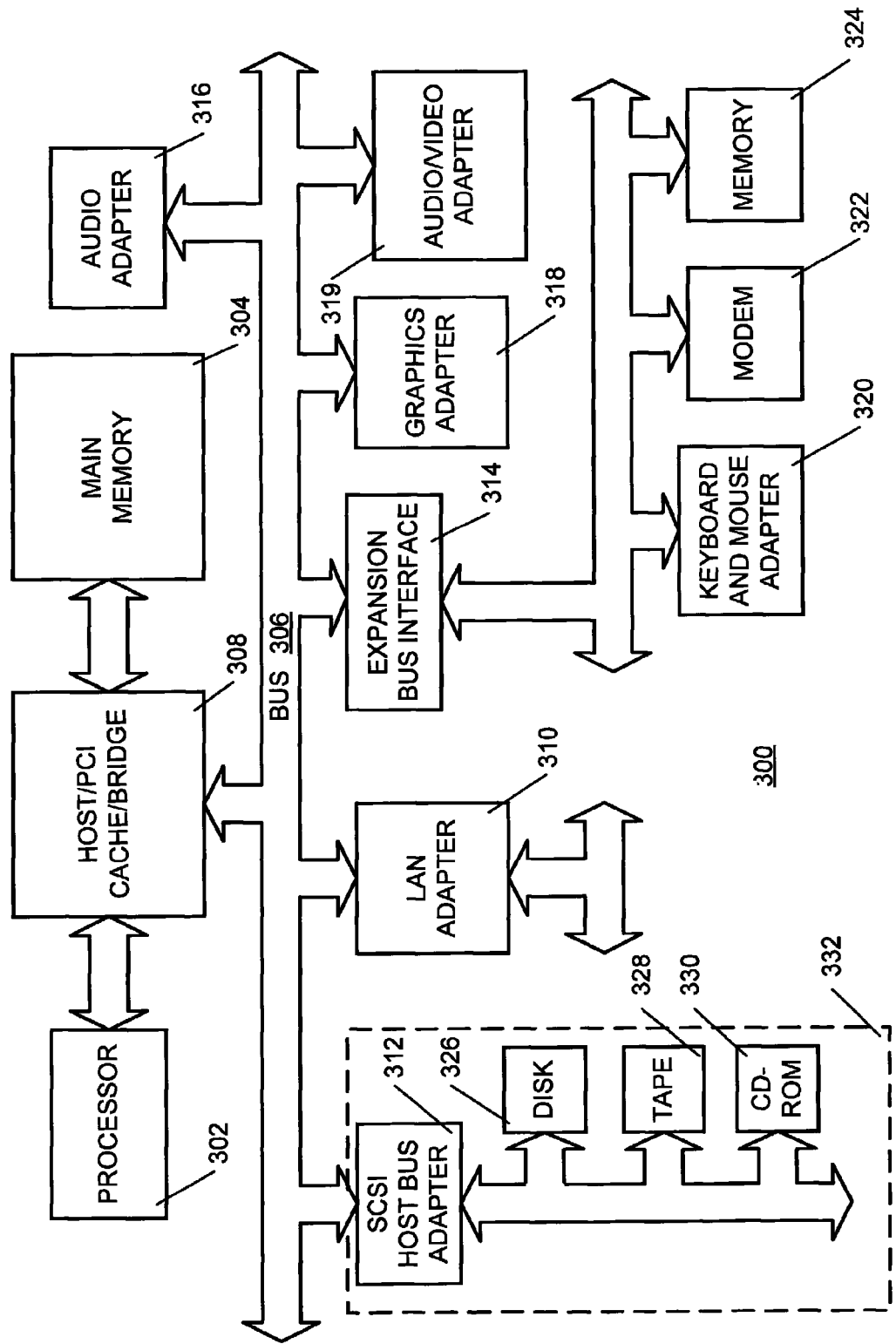
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of performing message searches across multiple mailboxes. The invention may be local to client systems 108, 110 and 112 of FIG. 1 or to the server 104 or to both the server 104 and clients 108, 110 and 112. Further, the present invention may reside on any data storage medium (i.e., floppy disk, compact disk, hard disk, ROM, RAM, etc.) used by a computer system.

The present invention will be explained using the search feature in Microsoft® Outlook Express 6. However, as it is well known in the field, search features in all MUA application programs will contain in some fashion the items that will be explained below.

Figure 4:
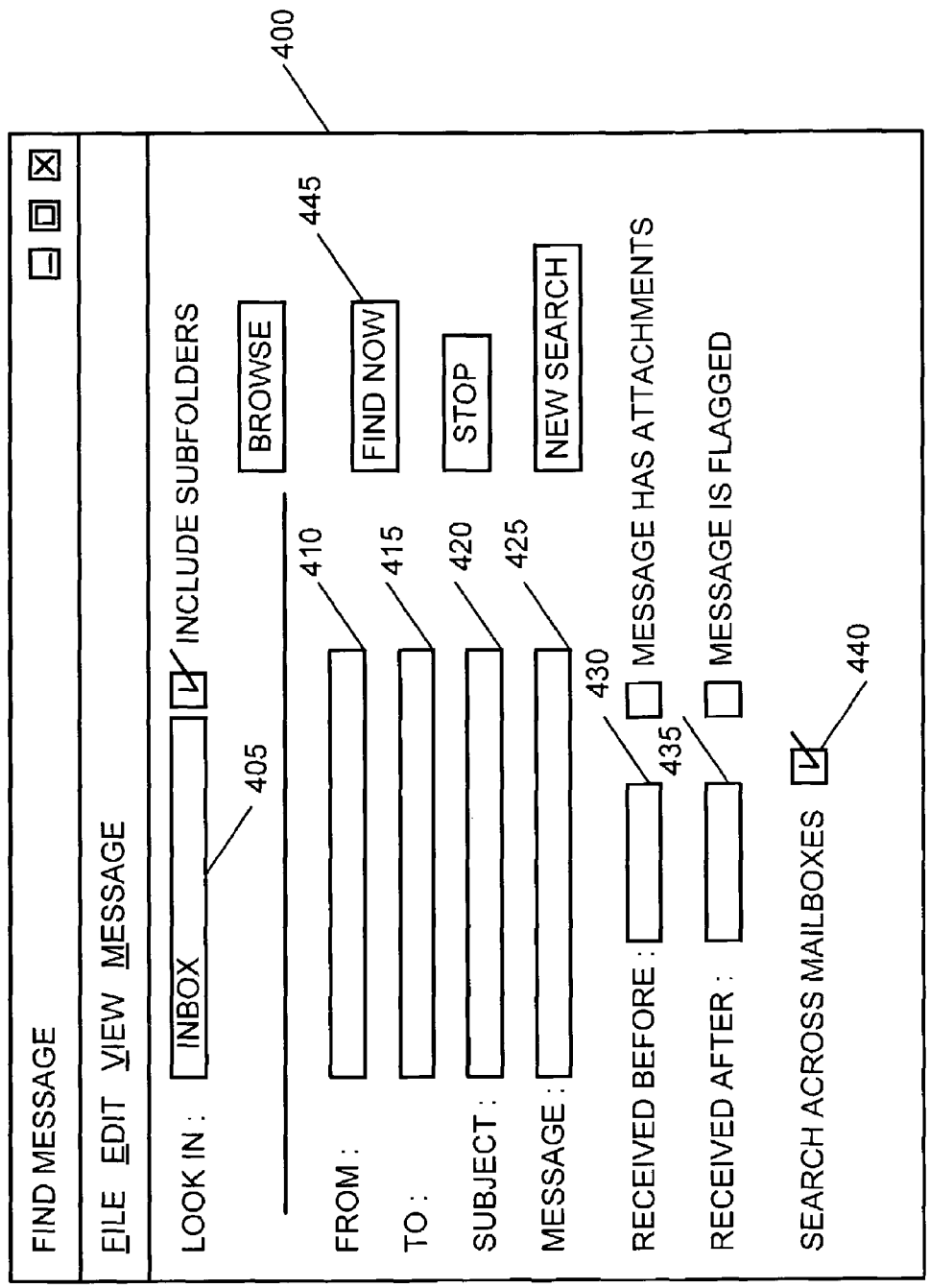
FIG. 4 is a graphical user interface (GUT) of a search feature.

FIG. 4 is a graphical user interface (GUI) 400 of the search feature in Microsoft® Outlook Express 6. In this figure, only items that are of importance to the invention are given a reference numeral. The GUI 400 contains a box 405 to indicate which part of a mailbox is to be searched. The GUI 400 also contains a "from" box 410, a "to" box 415, a "subject" box 420 and a "message" box 425. These boxes are used to designate whether particular senders, recipients, subject matters or messages, respectively, are to be searched for any search terms entered therein. The GUI 400 further contains a "received before" box 430 and a "received after" box 435 into which dates may be entered to delimit the span of time within which the search is to be performed.

In "search across mailboxes" box 440, a check mark may be placed if the user desires to perform the search across multiple mailboxes. Particularly, if the "search across mailboxes" box 440 is check marked, a window may pop open to prompt the user to enter pertinent information regarding each additional mailbox that is to be searched when "find now" box 445 is asserted.

Figure 5:
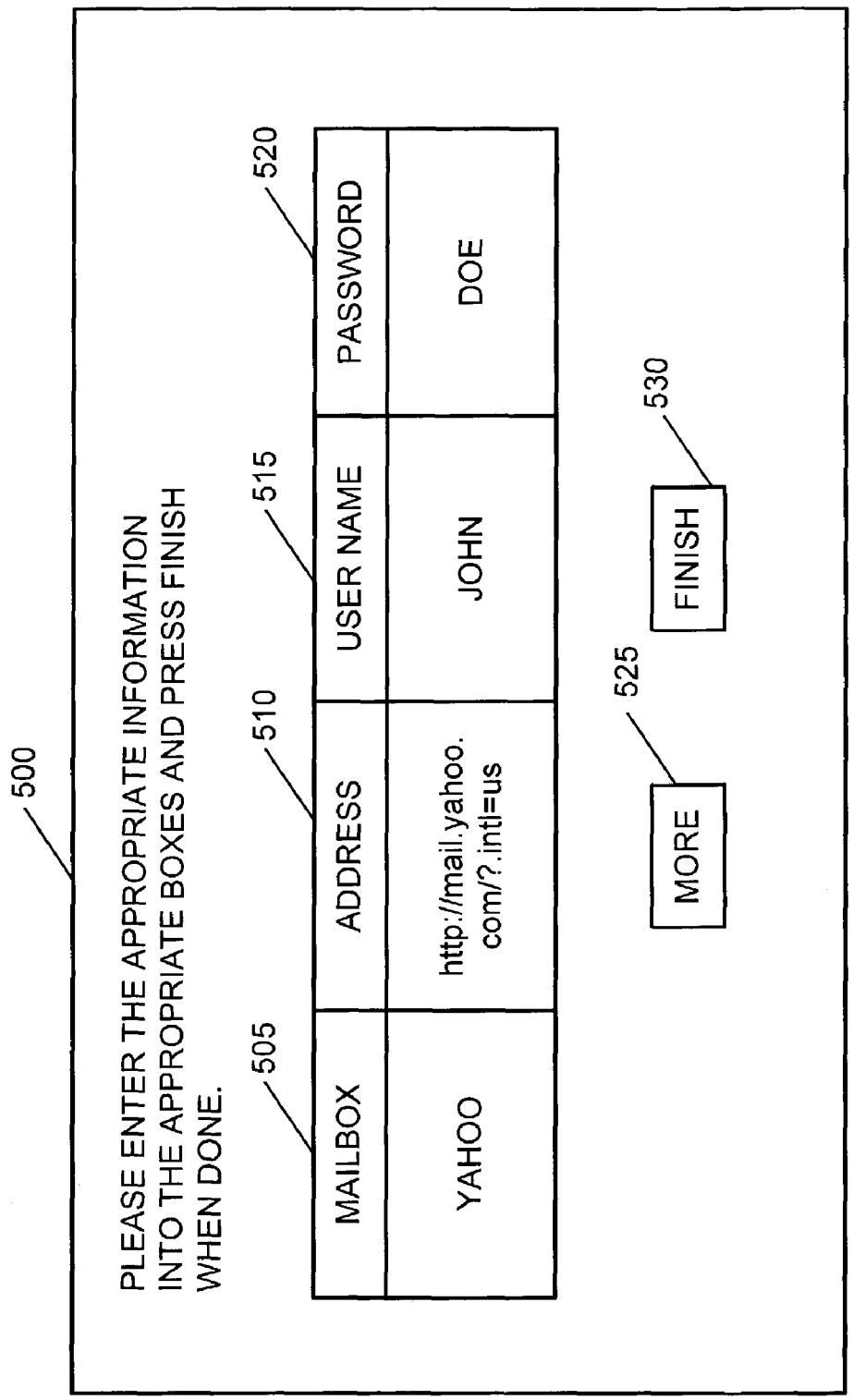
FIG. 5 depicts a representative pop-up window that may be used with the invention.

FIG. 5 depicts a representative pop-up window that may be used with the invention. FIG. 5 is used to prompt the user to enter an additional mailbox to be searched, the address of the mailbox, the user name and password used to access the mailbox. For example, if a user has a United States Yahoo mailbox that the user wishes to simultaneously search, the user may enter "YAHOO" under mailbox column 505. The address of the YAHOO mail account (i.e., http://mail.yahoo-.com/?.intl=us) may be entered under address column 510. The user, in addition, needs to enter the username (under username column 515) and password (under password column 520) used to access the mailbox. If the user wishes to simultaneously search another mailbox, the user may assert "more" button 525 to have another FIG. 5 displayed. When all the mailboxes and their requisite information have been entered the user may assert "finish" button 530 to begin the search.

FIG. 5 may be configured to be displayed each time a user needs to enter information about a new mailbox. Alternatively, FIG. 5 may be configured to be displayed once. Anytime thereafter, FIG. 6 may be displayed. That is, if "search across mailboxes" box 440 is checked when "find now" button 445 is asserted, FIG. 6 may pop open if the user has previously entered information regarding a mailbox to be simultaneously searched. For example, the second time the user who has the YAHOO mailbox wants to perform a search across multiple mailboxes, FIG. 6 may pop open instead of FIG. 5.

In FIG. 6, all the mailboxes and their requisite information that have previously been entered are displayed as shown. That is, all the mailboxes previously entered using FIG. 5 (i.e., YAHOO, mailbox2, mailbox3 etc.), would be displayed under mailboxes column 605, their addresses would then be displayed in addresses column 610. Likewise, the username associated with the mailbox and the password used to access the mailboxes will be displayed in usernames column 615 and passwords column 620, respectively. If the user needs to enter information about a new mailbox, the user may assert "more" button 625 to have FIG. 5 displayed. Otherwise, the user may assert "finish" button 630 to begin the search. If the user does not want to search a mailbox listed in FIG. 6, the user may indicate so by deleting the information relating to the mailbox in each column of FIG. 6 before asserting the "finish" button 630.

When the "finish" button of either FIG. 5 or FIG. 6 is asserted, the invention will access each mailbox in the figures. After accessing a mailbox, the invention executes the search feature of the mailbox. The search criteria entered in FIG. 4 are then passed to the search feature of the mailbox. If a search feature cannot use a search criterion, it may ignore it or indicate so in the result. The result of the search is put into a file that is passed back to the invention. The invention may then display the result to the user as shown in FIG. 7.

The invention may also allow a user to search for a particular message thread in a mailbox. For example, if a user has been exchanging messages with one or more users on a subject matter, the user may search for messages related to the subject matter. To do so, the user needs to highlight the message in question from the messages in the displayed result of FIG. 7 and assert the "related messages" search button 710. When this occurs, the invention may obtain and display all messages related to the highlighted message.

This aspect of the invention works on the basis that mail servers ordinarily assign a unique message identifier (i.e., message-Id) to every message sent to a recipient. Message-Ids help mail clients as well as mail servers keep track of the status of the messages. Further, message-Ids help system administrators (e.g., postmasters) troubleshoot technical issues such as mail loops or forged mail messages.

When a recipient replies to a message, the replied message ordinarily includes an "In-Reply-To" field. In the "In-Reply-To" field, the message Id of the message being replied to is entered. In some instances, instead of or in conjunction to the "In-Reply-To" field, a "References" field may be included. The "References" field is used to identify upstream posts to which a message is a response.

FIG. 8 depicts a representative message-Id in a header of an e-mail message. The message-Id is made of two components (i.e., components A and B). Component A is a string of characters and component B is the name of the server that assigned the message-Id to the message. This server is generally the server servicing the message sender.

In operation, the invention may recursively search for related messages downstream of the highlighted message using the "In-Replay-To" field. (A downstream message is a message that chronologically came after the highlighted message.) For example, the invention may check to see whether any message in the mailbox has the message-Id of the highlighted message in its "In-Reply-To" field. Each message that is identified as having the message-Id of the highlighted message in its "In Replay-to" field may be flagged as being a related message. Then, the invention may search for the message-Ids of the flagged messages in the "In-Reply-To" field of the other messages in the mailbox. As before, any message that has the message-Id of one of the flagged messages in its "In Reply-to" field will may flagged as a related message. The invention will continue this process until all downstream messages related to the highlighted message in the mailbox in question are properly tagged.

To obtain upstream messages (i.e., messages that chronologically came before the highlighted message), the invention may parse the header of the highlighted message to determine whether it contains an "In-Reply-To" field. If so, the invention may search for the message whose message-Id is in the "In-Reply-to" field of the highlighted message in the mailbox in question. The invention may recursively search the mailbox for messages downstream to this upstream message. The invention may then identify the next upstream message and conduct a recursive downstream search. Note that the process of identifying upstream messages, one message at a time, may be referred to as a recursive upstream search. Thus, the system may identify all related messages by performing upstream and downstream searches. After all the related messages are identified and properly tagged, the invention may present the result to the user.

Alternatively, the invention may first determine whether there is a "References" field in the header of the highlighted message. If there is, the invention may search for all the messages to which the message-Ids pertained to since they are related. Further, to ensure that all the related messages are identified in the mailbox, the invention may recursively search for messages related to each message whose message-Id is in the "References" field. After all the related messages are found, the invention may present the result to the user.

Figure 9:
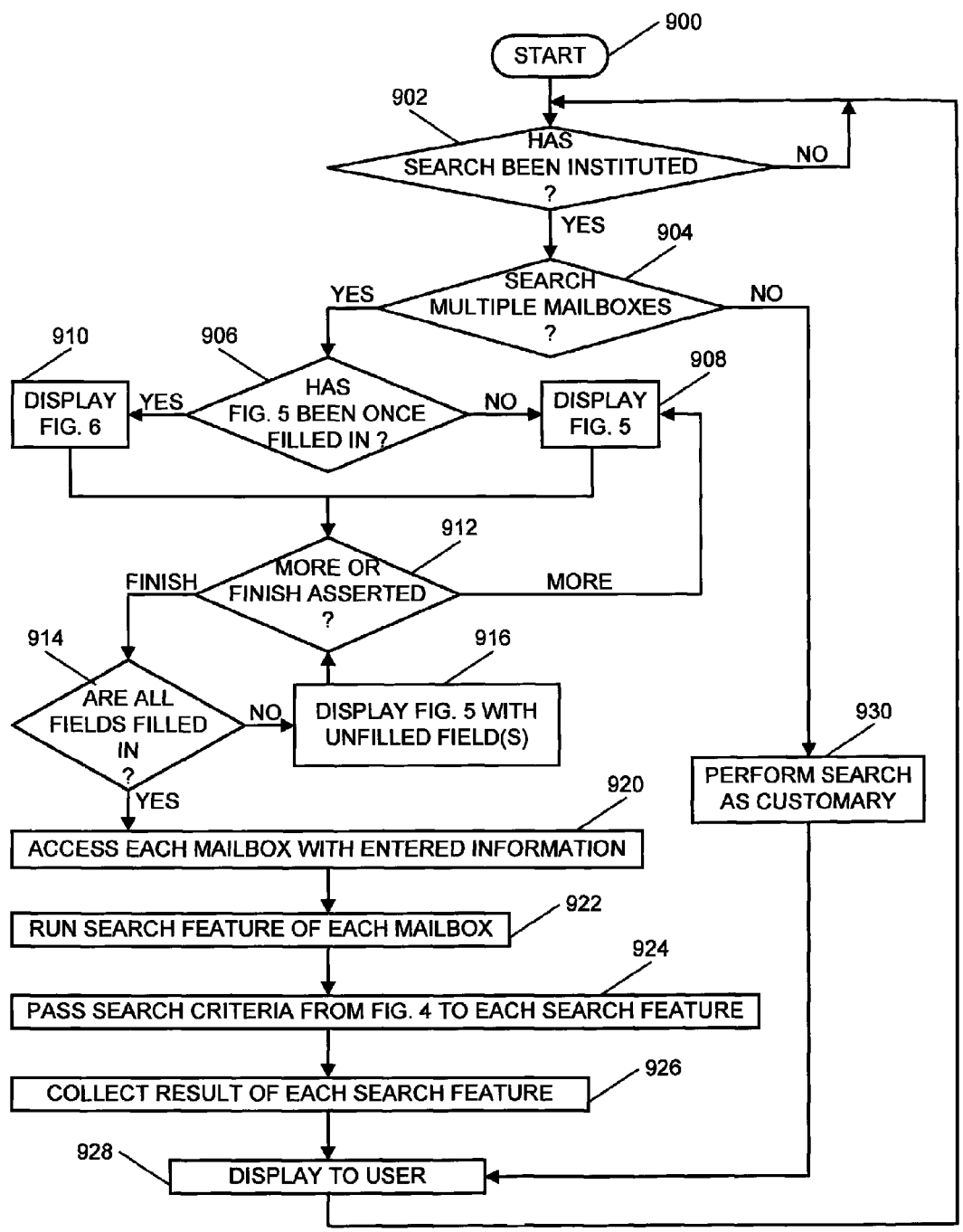
FIG. 9 is a flow diagram of a process that may be used by the invention.

FIG. 9 is a flowchart of a process that may be used to simultaneously search multiple mailboxes. The process starts when a user accesses the search feature of a mailbox (step 900). Then the process waits until the user begins the search (step 902). At that time, the invention checks to see whether "search across mailboxes" button 440 is checked. If not, the search is performed as customary and the result is displayed to the user before the process returns to step 902 (steps 904, 930 and 928).

If the "search across mailboxes" button 440 is checked, then multiple mailboxes are to be searched simultaneously. Then, a check is made to determine whether FIG. 5 has ever been filled in. As alluded to before, when FIG. 5 is filled in a table as shown in FIG. 6 is stored in a known location. Thus, a check for the table may be made at that location to determine whether FIG. 5 has ever been filled in before. If FIG. 5 has never been filled in before, FIG. 5 will be displayed to the user. Otherwise, FIG. 6 will be displayed (steps 904, 906, 908 and 910).

When either FIG. 5 or FIG. 6 is displayed, the invention will check to see whether the "more" or "finish" button (i.e., "more" button 525 or "finish" button 530 when FIG. 5 is displayed or "more" button 625 or "finish" button 630 when FIG. 6 is displayed) is asserted. If "more" button 525 or 625 is asserted, the procedure will return to step 908 and redisplay FIG. 5 (step 912). If "finish" button 530 or 630 is asserted, the invention will make sure that all required fields are filled in. If not, for each mailbox that is to be searched and for which all the required fields have not been filled in, a FIG. 5 will successively be displayed (steps 912, 914 and 916).

If all the required fields are filled in, each mailbox will be accessed using the information provided and the search feature of the mailboxes will be launched. After launching the search feature, the search criteria entered in FIG. 4 will be passed to each launched search feature. The result from each search launched search feature will be collected and displayed to the user as shown in FIG. 7 and the process will return to step 902 (steps 920, 922, 924, 926 and 928).

Figure 10:
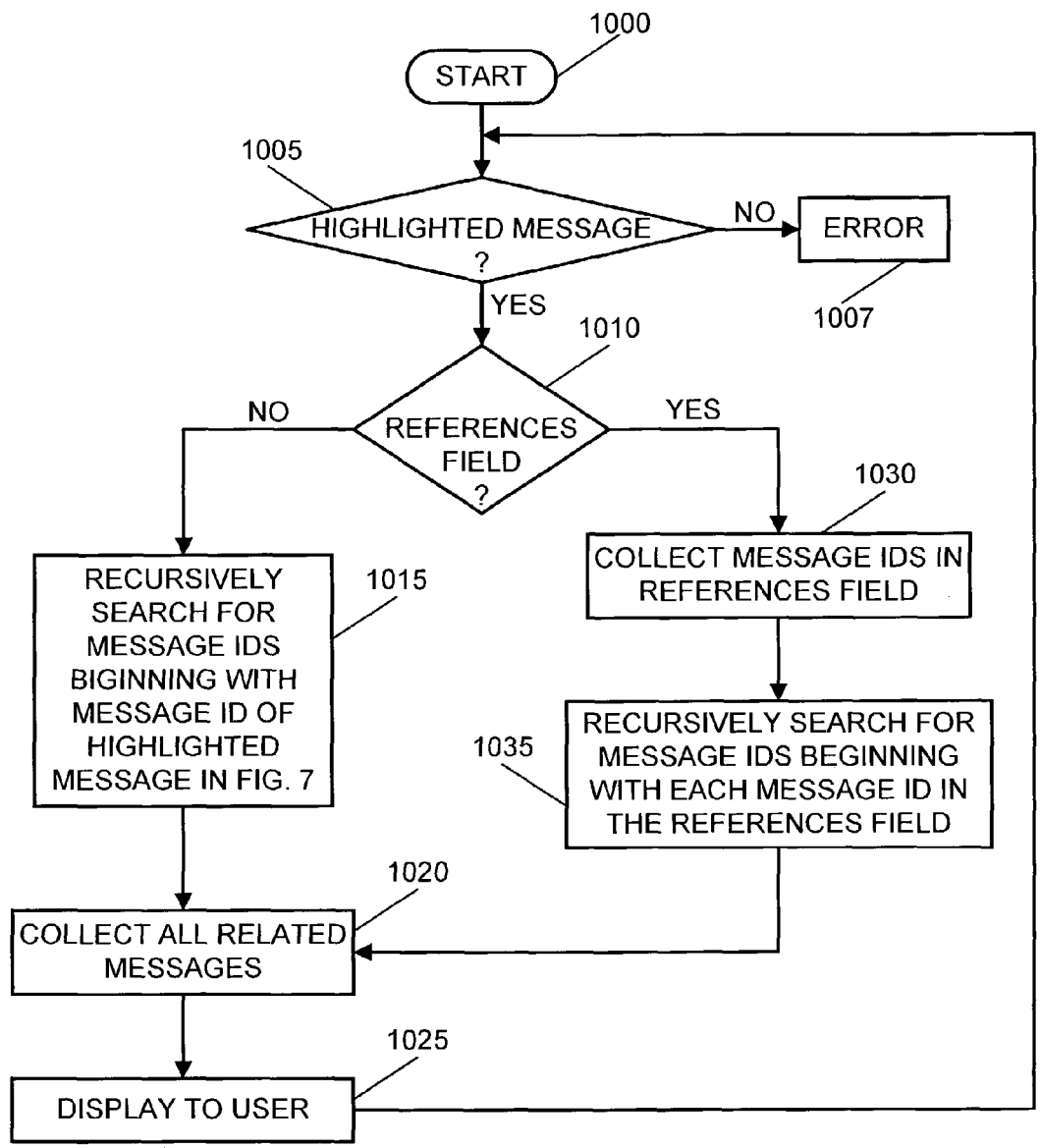
FIG. 10 is a flow diagram of a process that may be used to perform a search for related messages in a mailbox.

FIG. 10 is a flowchart of a process that may be used to implement searches for related messages. The process starts when "related messages" search button 710 is asserted (step 1000). Then a search is made to determine whether any message is highlighted. If not, an error may be generated reminding the user to do so (step 1007).

If a message is highlighted, then a check is made to determine whether the header of the highlighted message has a "References" field. If so, the message-Ids in the "References" field are collected and a recursive search (both downstream and upstream) is performed on each one of them. The result of each recursive search is collected and the aggregation is displayed to the user, as search results are customarily displayed to users, before the process returns to step 1005 (steps 1010, 1030, 1035, 1020 and 1025). If there is not a "References" field, then a search (again both downstream and upstream) may be performed using the message-Id of the highlighted message. The result of the search may then be displayed to the user before the process returns to step 1005 (steps 1010, 1015, 1020 and 1025).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of performing a search across multiple mailboxes comprising the steps of:
    launching a search feature of a currently accessed mailbox;
    entering at least one search term for a search;
    indicating whether the search is to be performed across multiple mailboxes, wherein each mailbox is identified by a mailbox name;
    identifying, if multiple mailboxes are to be simultaneously searched, each mailbox by providing an address, a username and a password, wherein the identifying step includes the step of displaying a table that includes multiple mailboxes that have been searched before if a search across multiple mailboxes has once been performed;
    accessing each mailbox using a provided address, username and password;
    launching the search feature of each accessed mailbox;
    passing the search criteria to each launched search feature;
    performing the search; and
    collecting the search results of the mailboxes and displaying the search results for each mailbox under the name of the mailbox.

2. A computer program product on a non-transitory computer readable medium for performing a search across multiple mailboxes comprising:
    code means for launching a search feature of a currently accessed mailbox;
    code means for entering at least one search term for a search;
    code means for indicating whether the search is to be performed across multiple mailboxes, wherein each mailbox is identified by a mailbox name;
    code means for identifying, if multiple mailboxes are to be simultaneously searched, each mailbox by providing an address, a username and a password, wherein the identifying step includes the step of displaying a table that includes multiple mailboxes that have been searched before if a search across multiple mailboxes has once been performed;
    code means for accessing each mailbox using a provided address, username and password;
    code means for launching the search feature of each accessed mailbox;
    code means for passing the search criteria to each launched search feature;
    code means for performing the search; and
    code means for collecting the search results of the mailboxes and displaying the search results for each mailbox under the name of the mailbox.

* * * * *